(12) United States Patent
Saiz

(10) Patent No.: US 6,378,802 B1
(45) Date of Patent: Apr. 30, 2002

(54) ENHANCE AERODYNAMIC PROFILE

(76) Inventor: Manuel Munoz Saiz, San Emilio 16, 1, 3, Madrid (ES), 28017

(*) Notice: Subject to any disclaimer, the term of this patent is extended or adjusted under 35 U.S.C. 154(b) by 0 days.

(21) Appl. No.: 09/372,890

(22) Filed: Aug. 12, 1999

Related U.S. Application Data

(63) Continuation-in-part of application No. 09/127,476, filed on Jul. 31, 1998, which is a continuation-in-part of application No. 09/095,957, filed on May 4, 1998.

(30) Foreign Application Priority Data

Apr. 6, 1999 (ES) .................................................. 9900680

(51) Int. Cl.[7] .............................. B64C 3/00; B64C 1/00; B64C 39/06; B64C 5/00; B64C 1/38
(52) U.S. Cl. ...................... 244/35 R; 244/34 R; 244/36; 244/130
(58) Field of Search .............................. 244/34 R, 35 A, 244/35 R, 36, 119, 130

(56) References Cited

U.S. PATENT DOCUMENTS

| | | | | |
|---|---|---|---|---|
| 1,406,923 A | * | 2/1922 | Brice ........................ | 244/35 R |
| 1,571,989 A | * | 2/1926 | Zimmermann ............ | 244/35 R |
| 1,981,700 A | * | 11/1934 | Hoffman .................... | 244/35 R |
| 4,314,795 A | * | 2/1982 | Dadone ..................... | 244/35 R |
| 4,412,664 A | * | 11/1983 | Noonan ..................... | 244/35 R |
| 4,652,213 A | * | 3/1987 | Thibert et al. ............. | 244/35 R |
| 4,776,531 A | * | 10/1988 | Noonan ..................... | 244/35 R |
| 4,941,803 A | * | 7/1990 | Wainauski et al. ........ | 244/35 R |
| 5,314,142 A | * | 5/1994 | Rao et al. .................. | 244/35 A |
| 5,344,102 A | * | 9/1994 | Nakadate et al. .......... | 244/35 R |
| 5,730,391 A | * | 3/1998 | Miller, Jr. et al. ............ | 244/36 |

OTHER PUBLICATIONS

Shapiro, Ascher; The Dynamics and Thermodynamics of Compressible Fluid Flow; vol. 1; p. 456.*

* cited by examiner

*Primary Examiner*—Charles T. Jordan
*Assistant Examiner*—Lulit Semunegus
(74) *Attorney, Agent, or Firm*—Robert M. Schwartz

(57) ABSTRACT

The enhanced aerodynamic profile of the invention consists of a profile consisting of three sections: a front or leading edge of two sides or plates forming an acute dihedral angle with the vertex facing forward, a central section formed by two parallel sides or plates, and a rear section or trailing edge formed by two sides or plates at an acute dihedral angle with the vertex facing rearward, where the unions on the lower or upper surfaces are suitably rounded, where the front section is a fin or cone turning on an axis which divides it into two unequal parts, the rear part being larger, said fin or cone has the lower surface of its rear section inclined, adapting with another which is inclined in the upper front part of the central section, said fin with positive leading angles is automatically oriented with the direction of the slipstream.

14 Claims, 4 Drawing Sheets

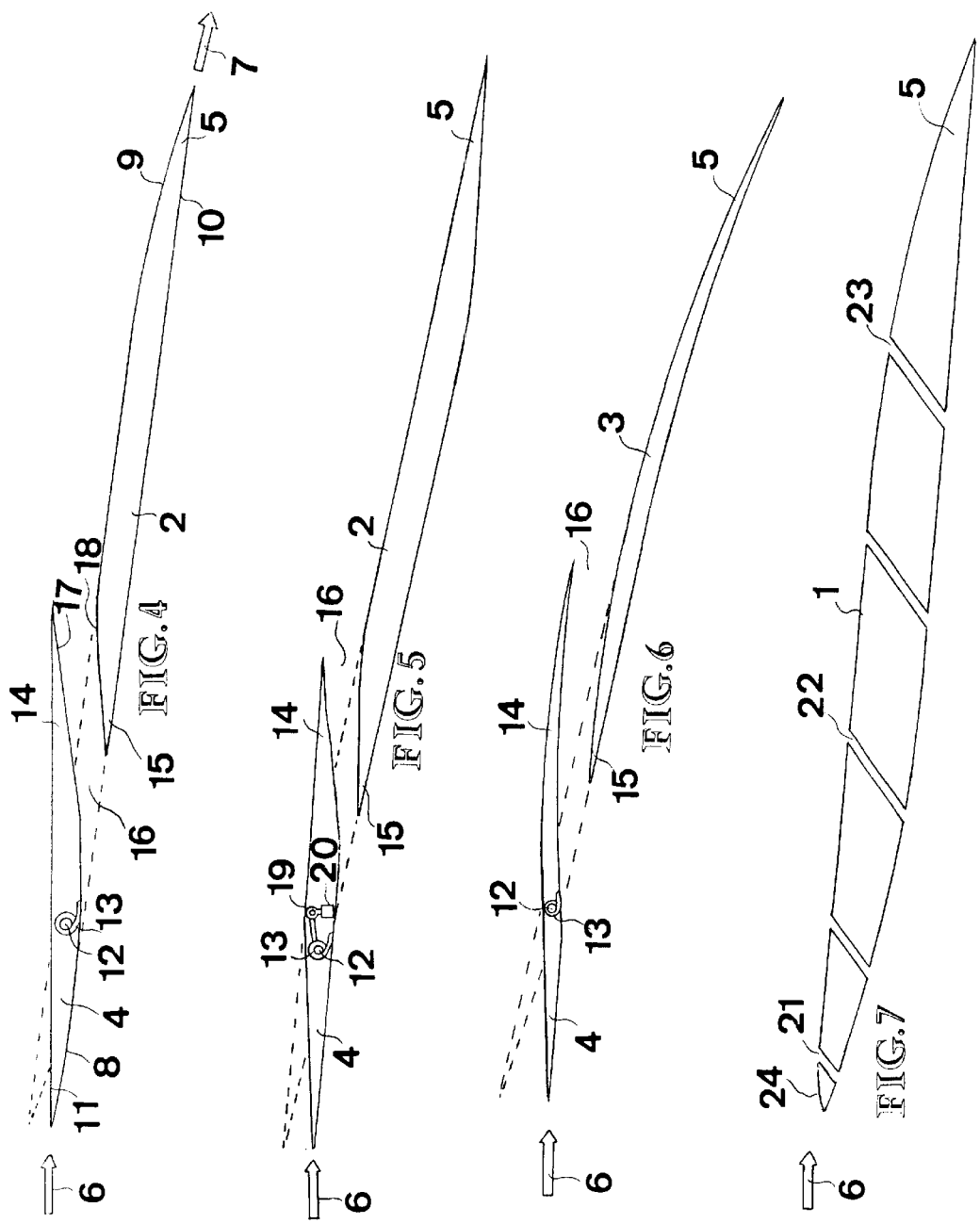

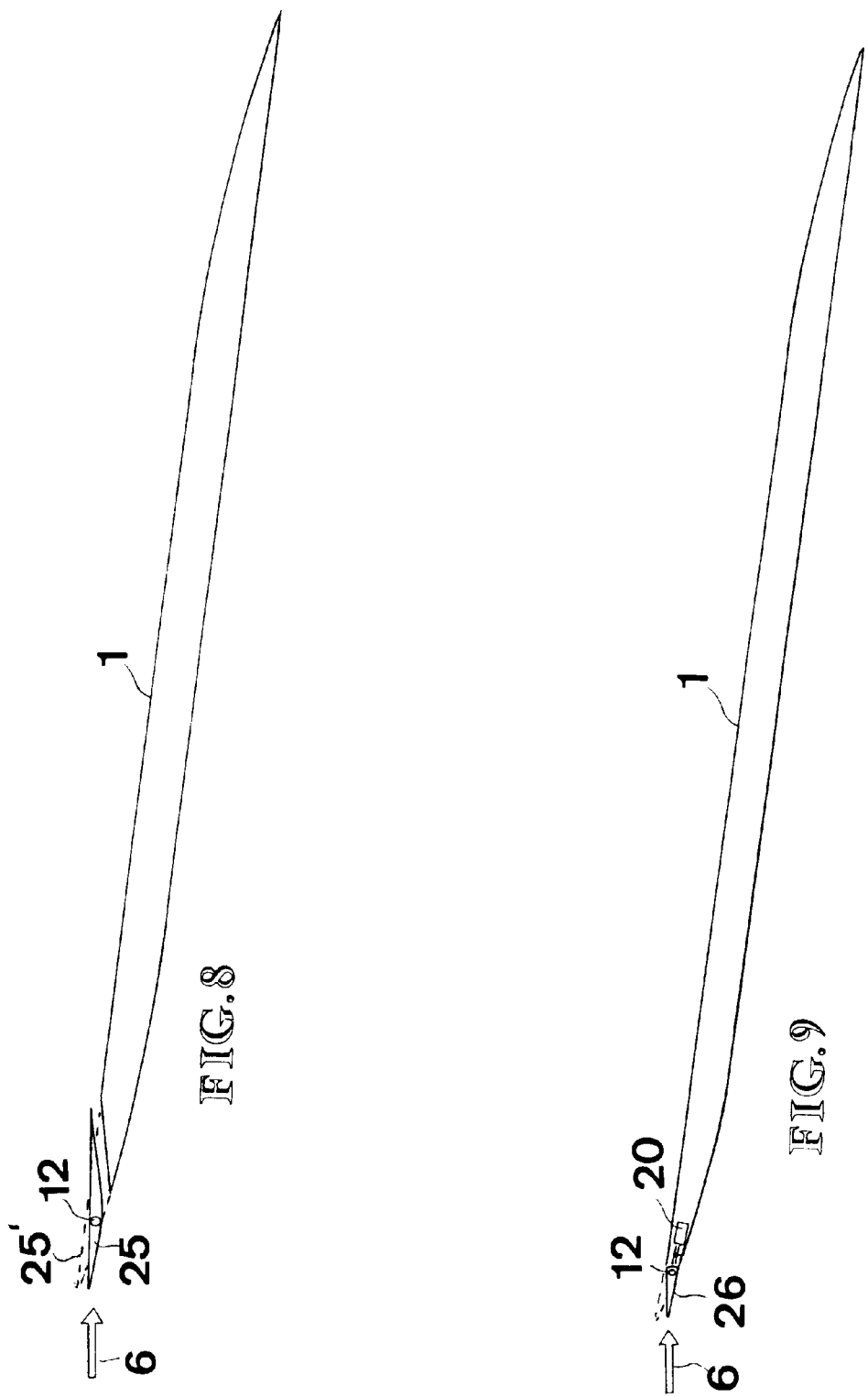

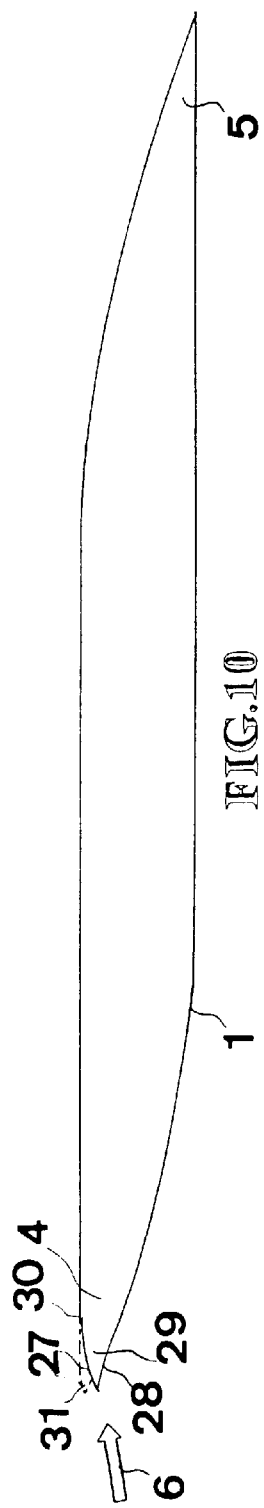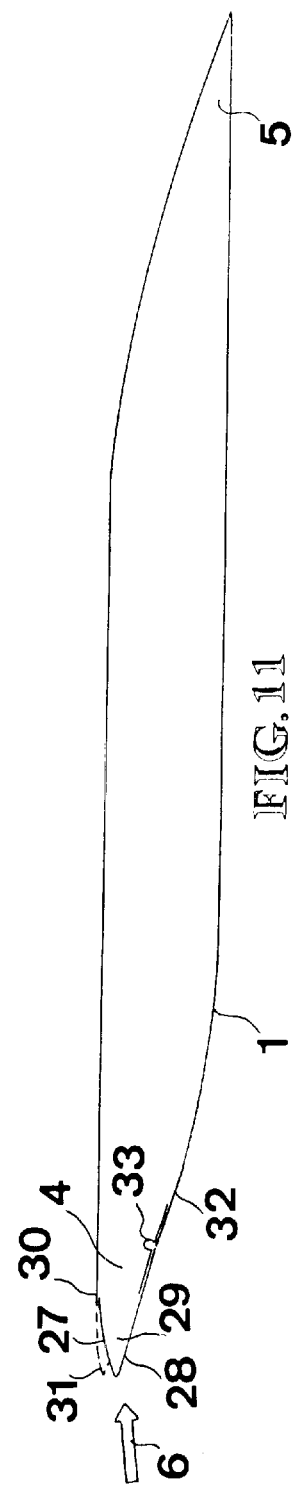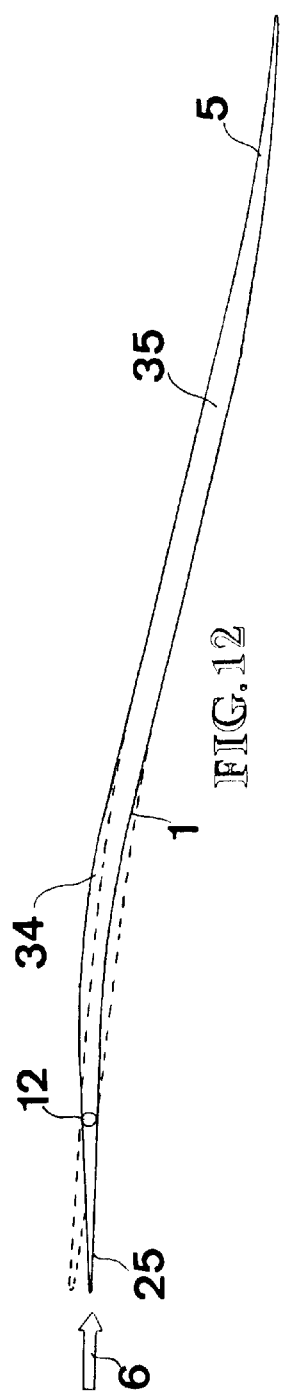

ENHANCE AERODYNAMIC PROFILE

CROSS REFERENCES TO RELATED APPLICATIONS

This is a continuation-in-part of applications Ser. No.09/127,476 filed on Jul. 31, 1998 and Ser. No. 09/095,957 filed on May 4, 1998.

This patent claims the priority date of Spanish Patent P9900680 filed on Apr. 6, 1999. The basis for priority in this case is the Paris Convention for the Protection of Industrial Property (613 O.G. 23, 53 Stat 1748). The Spanish patent application was filed in The Official Patent and Trademark Office of Spain,

BACKGROUND OF THE INVENTION

1. Field of the Invention

For aircraft fuselages, horizontal stabilisers, etc.

2. Description of the Related Art

Existing aerodynamic profiles have a transversal cross-section with a rounded leading edge which is partly elliptical or oval, with the trailing edge ending in a very acute dihedral angle, the upper surface being convex and the lower surface substantially flat, and with a relatively high lift/resistance ratio.

DESCRIPTION OF THE INVENTION

The enhanced aerodynamic profile of the invention consists of a profile which is similar to that in U.S. Pat. No. 9,701,753, applied to fuselages and consisting of three sections: a front or leading edge of two sides or plates forming an acute dihedral angle with the vertex facing forward, a central section formed by two parallel sides or plates, and a rear section or trailing edge formed by two sides or plates at an acute dihedral angle with the vertex facing rearward. This profile ensures maximum performance, namely a maximum lift/resistance ratio per unit of surface. The unions on the lower or upper surfaces are suitably rounded. The sides or plates of the profile of the three sections may be flat, curved, semi-cylindrical or semi-conical.

The top of the leading-edge is an extension of the top of the flat central section, and the lower inclined surface of the front area is a ramp beginning in the top front area and dropping in a rearward incline to the bottom fact of the central section. The bottom of the trailing egde is an extension to the bottom of the central section, the upper face of which slopes from the trailing edge and is a ramp begining at the top of the central section, dropping in a rearward incline until meeting the base. Here, lift is produced in the front and rear section of the profile.

In one variant, the central section of the profile is slightly inclined with the bottom of the leading edge extending with the bottom of the central section and the horizontal top, said top having its trailing edge in an extension with the top of the central section and the lower horizontal part. Here, lift occurs over the whole profile In all cases, the aerodynamic profile may be slightly curved, with convexity toward the upper surface.

A third variant has a horizontal leading edge and curved central section and trailing edge, forming an arch with the convexity toward the extrados. This provides lift over the centre and rear of the profile.

These profiles are correct for horizontal flight with limited leading angle.

To be practical for certain leading angles and prevent loss of the boundary layer and air current on the extrados, the following front section or rotary or fixed leading edge must be employed.

a) The front section is a fin or cone turning on an axis which divides it into two unequal parts, the rear part being larger. Said fin or cone has the lower surface of its rear section inclined, adapting with another which is inclined in the upper front part of the central section. Said fin with positive leading angles is automatically oriented with the direction of the ram air, to form a groove or slot between said section and the front of the central section whose leading edge cuts the air with a very acute dihedral angle, with its upper face approximately parallel to the ram air, while a spring tends to keep the fin and main body together. An anti-gust ram prevents rapid movements of the fin or cone. This can also be done with a small rotary fin or cone in the upper part of the front section.

b) In a variant, the fin or cone is turned on its axis by a hydraulic ram or electric system, etc.

c) A further variant has the top of the front area curved slightly downward and grooves or slots between the intrados and extrados to reduce or delay the release of the boundary layer and air current on the extrados. These grooves or slots are optional.

d) Also can be used an small rotary fin or cone on the upper part of the front section, said fin is actuated by a ram.

e) The upper, front and rotating sharp edge or cone, with the lower surface flexible or divided by two springs or steel tapes, and the upper surface sliding and slightly close to the upper surface of the extrados.

f) in another variant, the profile uses a very thin and slightly inclined profile with its trailing edge in the same direction that the ram air, with a front flexible zone and a fin that rotates around a very forward shaft, that allows the fin orientates with all leading angles, and the rear zone of the profile is fixed an rigid.

Operation

As the aircraft and the profile move forward, the air arriving for example at the area of the arrow 6 is forced to descend to the level of the area of the arrow 7, producing a reaction that tends to raise the aerodynamic profile.

Another interpretation could be that the air reaching the inlined frontal area and/or the central zone and/or the rear zone deflects the air downward, thus creating an upward reaction of the profile, in other cases, on leaving the inclined lower zone, there is also an upward reaction.

For positive leading angles, the frontal rotary fin or cone is oriented by the ram air, further creating a groove or slot preventing the release of the lower surface air current.

BRIEF DESCRIPTION OF THE DRAWINGS

FIG. 2 to 12 show squematic cross-section views of different variants

DETAILED DESCRIPTION OF THE PREFERRED EMBODIMENTS

Figure 1:
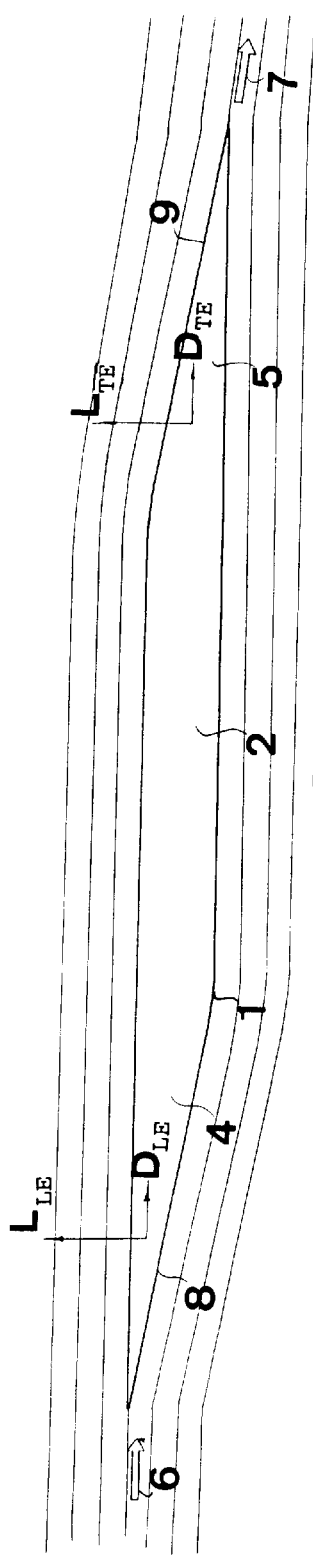
FIG. 1 shows a schematic and cross-section view of the aerodynamic profile.

FIG. 1 depicts the aerodynamic profile 1, the front section or leading edge 4 of two sides or plates forming an acute dihedral angle with the vertex facing forward, where the lower surface is a ramp and the upper surface is an extension of the central section, the central section 2 formed by two parallel sides or plates, and a rear section or trailing edge formed by two sides or plates at an acute dihedral angle 5 with the vertex facing rearward and where the lower surface is an extension of the central section and the upper surface is a ramp 9. The vectors L$_{LE}$ and L$_{TE}$ show the lift produced by the front and rear sections respectively and vectors D$_{TE}$ and D$_{TE}$ the drag to advance produced by said sections. Lateral friction drag is not shown as is similar to the one produced by actual profiles. Air ram 6 and 7 are indicated by arrows.

Figure 2:
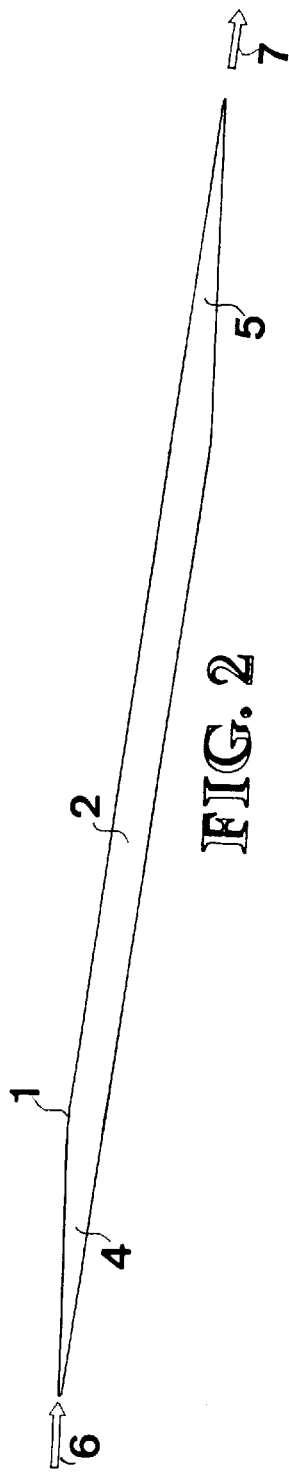

FIG. 2 depicts the incline profile 1, the incline central section 2, the leading edge section 4, and the trailing edge section 5. Air ram 6 and 7 are indicated by arrows.

Figure 3:
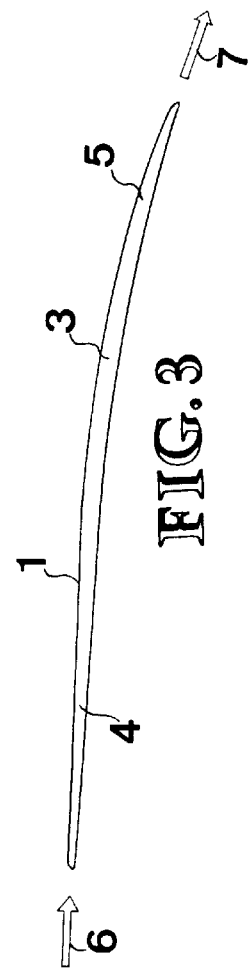

FIG. 3, depicts the curved aerodynamic profile 1, the front or leading edge section 4 and the curved central 3 and trailing edge 5 sections. Air ram 6 and 7 are indicated by arrows.

FIG. 4 depicts the central section 2 of the aerodynamic profile, formed by two parallel sides or plates, the frontal section of the fin 4, formed by two surfaces that determine a dihedral angle, where the lower surface is a ramp 8 and the upper 11 is an extension of the top side of the central section, the rotary shaft of the fin 12, the spring 13, the rear inclined section of the fin 14, the front inclined section of the main zone of the profile 15, the slot 16 between surfaces 17 and 18, and the trailing edge formed by two sides or plates that determine an acute dihedral angle 5, formed by the sides or plates 9 and 10. Air ram 6 and 7 are indicated by arrows. It show the profile the fin or cone rotated due to an positive leading angle.

FIG. 5 depicts the central section of the aerodynamic profile 2, the front section of the fin or cone 4, the rotary shaft of the fin 12, the spring 13, the linkage 19 and the acting or anti-gust ram 20, the rear, inclined section of the fin or cone 14, the front, inclined section of the main zone of the profile 15, the slot 16, and a trailing edge formed by two surfaces that determine an acute dihedral angle 5. Air ram 6 is indicated by an arrow. It shows a profile of central inclined section profile type, FIG. 2, with the fin or cone rotated by a positive leading angle.

FIG. 6 depicts the front section of the fin or cone 4, the rotating shaft of the fin 12, the spring 13, the rear, inclined section of the fin or cone 14, the front inclined section of the main zone of the profile 15, the slot 16, and the central section 3 and the curved trailing edge formed by an arch with the convexity toward the extrados formed by two surfaces that determine an acute dihedral angle 5. Air ram 6 is indicated by an arrow. It shows a central section profile and trailing edge type profile with the fin or cone rotated by a positive leading angle.

FIG. 7 depicts the aerodynamic profile 1, the upper side of the front section slightly curved downward 24, the slots 21, 22 and 23 between intrados and extrados and the rear section 5. Air ram 6 is indicated by an arrow.

FIG. 8 depicts the aerodynamic profile 1, the small front rotary fin or cone 25 and its rotary shaft 12 and the retracted fin 25'. Air ram 6 is indicated by an arrow.

FIG. 9 depicts the aerodynamic profile 1, the small rotary fin or cone on the upper zone of the front section 26 moved by the ram 20 and the rotary shaft 12. Air ram 6 is indicated by an arrow FIG. 10 depicts the aerodynamic profile 1, the upper, front and rotating sharp edge or cone 29, with the flexible lower surface 28, the sliding and slightly flexible upper surface 27 close to the upper surface of the extrados 30. The front sharp edge or cone at high speed 31. Air ram 6 is indicated by an arrow.

FIG. 11 depicts the aerodynamic profile 1, the upper, front and rotating sharp edge or cone 29, with the lower surface 28 and 32 divided by two springs or steel tapes 33, the sliding and slightly flexible upper surface 27 close to the upper surface of the extrados 30. The front sharp edge or cone at high speed 31. Air ram 6 is indicated by an arrow.

FIG. 12 depicts the very thin and slightly inclined aerodynamic profile 1, with the trailing edge 5 with the same direction than the slipstream, the flexible zone of the profile 34 and the fin 25 that rotates around a shaft very forward 12 that allows to be orientated with all leading angles. 35 is the fixed and rigid rear zone of the profile. Air ram 6 is indicated by an arrow.

Some fins act like leading edge flaps.

What I claim is:

1. An enhanced aerodynamic profile comprising:
    a leading edge of two sides forming an acute dihedral angle with a vertex facing forward;
    a central section formed by two parallel sides; and
    a rear section formed by two sides at an acute dihedral angle with a vertex facing rearward, wherein unions on surfaces of said profile are suitably rounded and wherein said profile is asymmetrical.

2. An enhanced aerodynamic profile according to claim 1 wherein said leading edge has a top that is an extension of the top of a flat central section, and a lower inclined surface of a front area is a ramp beginning in said top front area and dropping in a rearward incline to a bottom face of said central section, where said bottom of a trailing edge is an extension to said bottom of said central section, an upper face of said trailing edge slopes from said trailing edge and is a ramp beginning at the top of said central section, dropping in a rearward incline until meeting said bottom of said profile.

3. An enhanced aerodynamic profile according to claim 1 wherein said central section of said profile is slightly inclined with a bottom of said leading edge extending with said bottom of said central section and a horizontal top of said leading edge, said top having a trailing edge in an extension with said top of said central section and a lower horizontal part.

4. An enhanced aerodynamic profile according to claim 1 wherein said aerodynamic profile is slightly curved, with a convexity toward an extrados.

5. An enhanced aerodynamic profile according to claim 1 wherein said profile has a horizontal leading edge and a curved central section and trailing edge, forming an arch with a convexity toward said extrados.

6. An enhanced aerodynamic profile according to claim 1 wherein said front section is a fin or cone turning on an axis which divides said front section into two unequal parts, a rear part being large, said fin or cone having a lower surface of its rear section inclined, adapting with another which is inclined in the upper front part of the central section, said fin with positive leading angles automatically oriented with the direction of said ram air, to form a groove between said section and said front of said central section whose leading edge cuts said air with a very acute dihedral angle, with its upper face approximately parallel to the ram air, while a spring tends to keep said fin and main body together, and has an anti-gust ram that prevents rapid movements of said fin and cone.

7. An enhanced aerodynamic profile according to claim 1 wherein said profile uses a small rotary fin or cone in an upper part of said front section.

8. An enhanced aerodynamic profile according to claim 7 wherein said fin or cone is turned on its axis by a hydraulic ram, electric system, or the like.

9. An enhanced aerodynamic profile according to claim 1 wherein said top of said front area is curved slightly downward and slots between an intrados and said extrados.

10. An enhanced aerodynamic profile according to claim 1 wherein a small ram-driven rotary fin or cone is used on said upper part of said front section.

11. An enhanced aerodynamic profile according to claim 1 wherein the sides of the aerodynamic profile of said three sections are curved, semi-cylindrical or semi-conical.

12. An enhanced aerodynamic profile according to claim 1 wherein said upper, front and sharp edge or cone is rotary and has a flexible lower surface and an upper surface sliding and slightly close to an upper surface of said extrados.

13. An enhanced aerodynamic profile according to claim 1 wherein said upper, front and sharp edge or cone is rotary and has a lower surface divided by two springs or steel tapes, and an upper surface sliding and slightly close to an upper surface of said extrados.

14. An enhanced aerodynamic profile according to claim 1 wherein a thin and slightly inclined profile with its trailing edge in the same direction as that of said ram air is used, with a front flexible zone and a fin that rotates around a very forward shaft, that allows said fin to be oriented with all leading angles, and a rear zone of the profile is fixed and rigid.

* * * * *